March 31, 1959 H. GOSSEN ET AL 2,879,702
EXPOSURE CONTROL
Filed May 12, 1954 3 Sheets-Sheet 1
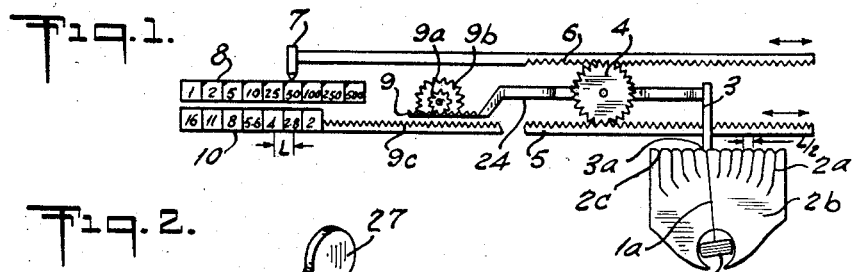
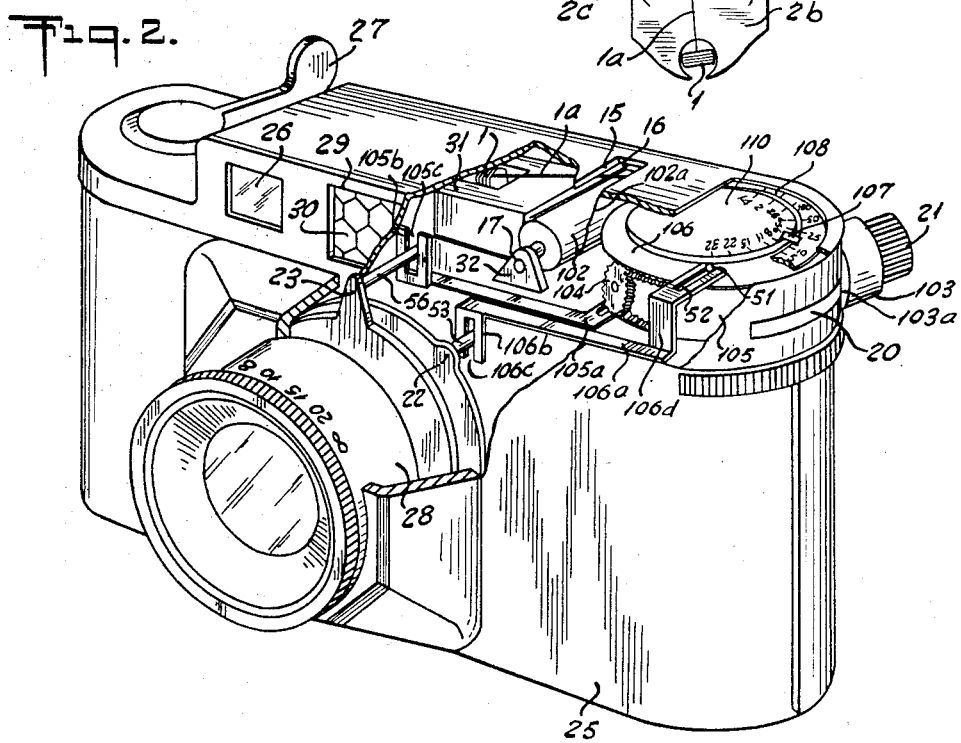
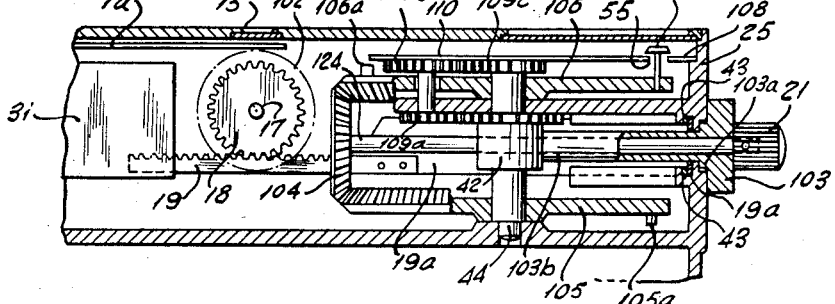
INVENTORS
HANS GOSSEN
WOLF KRÖGER
BY WALTER ILLING
ATTORNEY March 31, 1959 H. GOSSEN ET AL 2,879,702
EXPOSURE CONTROL
Filed May 12, 1954 3 Sheets-Sheet 2

INVENTORS
HANS GOSSEN
WOLF KRÖGER
BY WALTER ILLING

ATTORNEY

March 31, 1959  H. GOSSEN ET AL  2,879,702
EXPOSURE CONTROL
Filed May 12, 1954  3 Sheets-Sheet 3
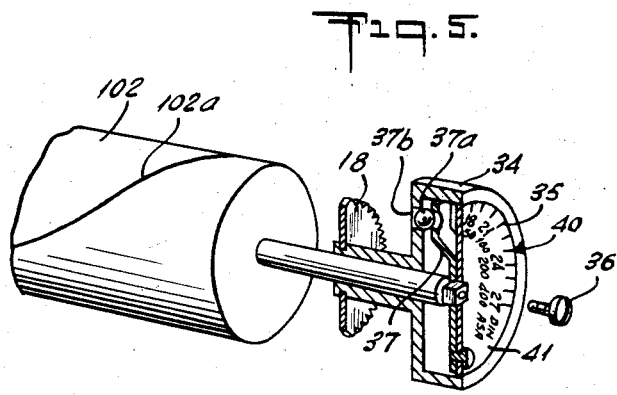
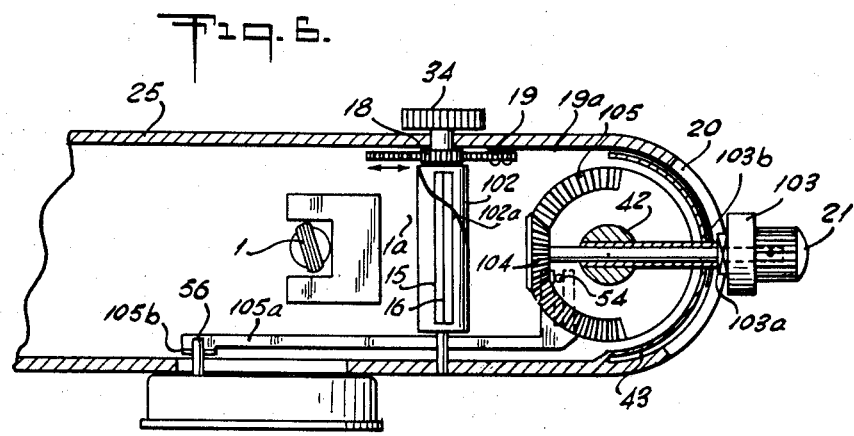
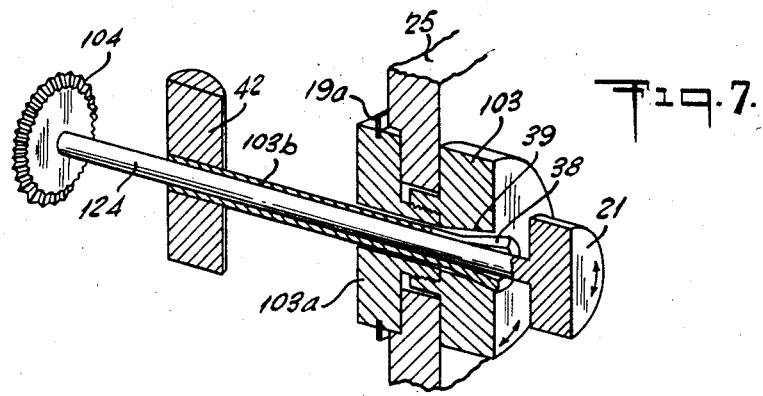
INVENTORS
HANS GOSSEN
BY WOLF KRÖGER
WALTER ILLING
ATTORNEY

United States Patent Office 2,879,702
Patented Mar. 31, 1959

2,879,702

EXPOSURE CONTROL

Hans Gossen, Wolf Kröger, and Walter Illing, Erlangen, Germany, assignors to P. Gossen & Co. G.m.b.H., Erlangen, Germany Application May 12, 1954, Serial No. 429,358

Claims priority, application Germany May 19, 1953

3 Claims. (Cl. 95—10)

This invention relates to certain improvements in or relating to semi-automatic means for adjusting the shutter speed and the diaphragm opening of photographic cameras in accordance with the indication of an exposure meter.

It is an object of the invention to provide means for facilitating said adjustment and avoiding errors in transmitting the reading of the exposure meter to the adjusting means.

Another object of the invention is to ensure a more accurate adjustment without steps and to avoid the inaccuracies which were caused by the steps in the scales of the conventional exposure meters.

A further object of the invention is to provide means for automatically changing the shutter speed adjustment in dependence upon readjustments of the diaphragm opening or vice versa, so as to effect complementary readjustments of said exposure values in accordance with the actually measured light intensity of the image field.

A still further object of the invention is to provide means for readjusting the semi-automatic mechanism to allow for the actual sensitivity of the photographic material and/or for preset filter means.

With these and other objects in view, this invention consists in the details of construction, combination of elements and operation hereinafter set forth and then specifically designated by the claims.

In order that those skilled in the art to which this invention appertains may understand how to make and use the same, we will describe its construction in detail, referring by numerals to the accompanying drawings forming part of this application in which:

Fig. 1 is a diagrammatic view illustrating the principle of operation of the invention, Fig. 2 is a perspective view of a camera embodying a mechanism operating according to the principle illustrated in Fig. 1, Fig. 3 is a vertical central section of the gear system thereof, Fig. 4 is a perspective view of said gear system, with the various elements thereof drawn apart, Fig. 5 is a perspective view of a detail thereof, showing the means for adjusting the mechanism to allow for the actual film sensitivity.

Fig. 6 is a horizontal section of the mechanism thereof, and

Fig. 7 is a perspective view of a further detail thereof, showing the means for selectively locking and releasing the sun wheel shaft as to its angular direction and rotational displacement, respectively.

Similar reference numerals denote similar parts in the different views.

Figure 4:
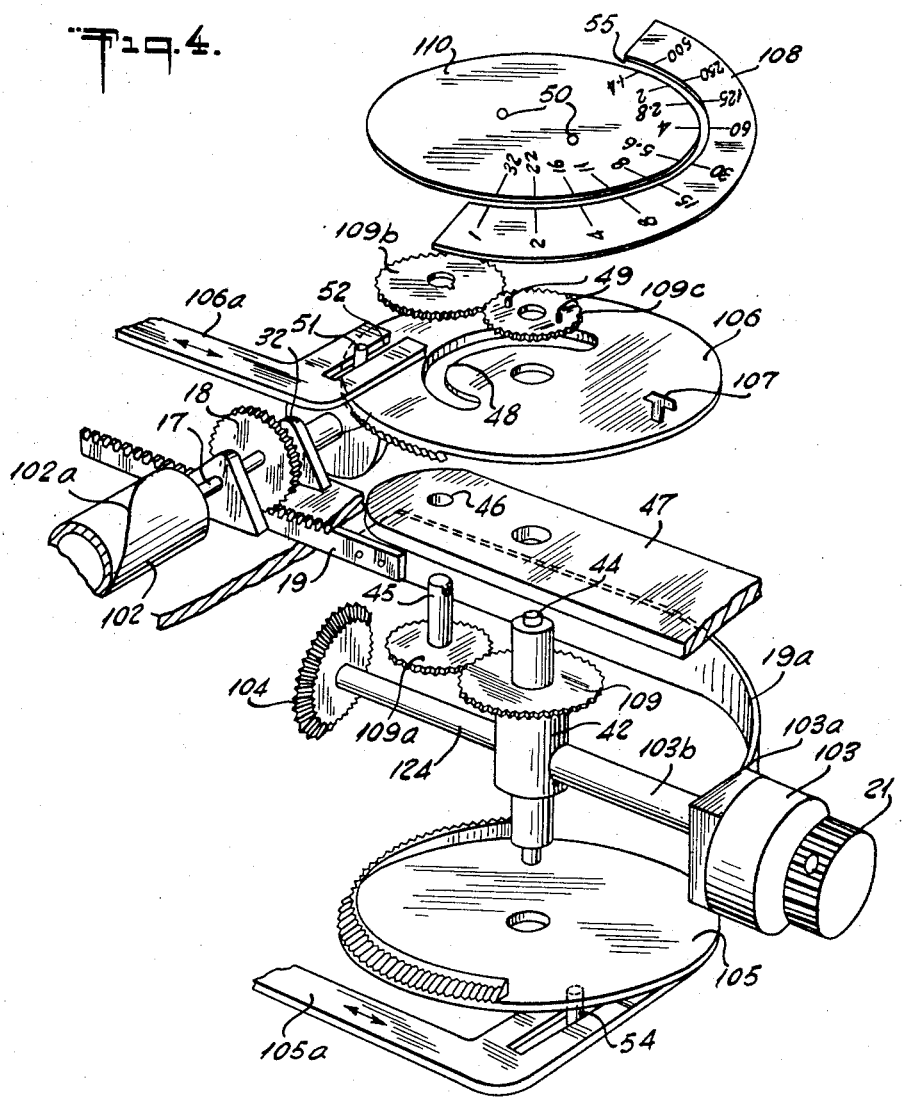

Referring now to the drawings in greater detail, and first to Fig. 1, it will be seen that the light intensity value of the image field converted into electric current or voltage, respectively, is measured by a moving coil 1 of a galvanometer and indicated by a pointer 1a, i.e., on a scale 2a of a scale plate 2b which is formed with a serrated edge 2c. The pointed lower end 3a of a finger or bar 3 which forms a handle can be selectively engaged with any of the notches or recesses of the serrated edge 2c. A sun wheel 4 of a planetary gear is mounted for rotation on a bar 24 which is rigidly connected to the handle 3. The sun wheel 4 meshes with toothed racks 5 and 6, the rack 5 being connected to the diaphragm opening adjusting means of the camera (not shown) while the rack 6 is connected to the shutter speed adjusting means (not shown). Rigidly mounted on the extreme left hand end of the toothed rack 6 is a pointer 7 indicating the time of exposure or shutter speed on a stationary scale 8.

The bar 24 is cranked as shown and formed with a toothed portion 9 meshing with a pinion 9a which is rigidly connected to a toothed wheel 9b. The latter in its turn meshes with a toothed rack 9c bearing at its left hand end a scale strip 10 indicating diaphragm or stop values. The transmission ratio of the wheels 9a, 9b is 1:2, so that a displacement of the bar 24 by a certain amount will cause a displacement of the bar 9c by twice said amount. The distance between the center lines of two adjacent scale lines of scale 10 is L, and the distance between two succeeding engaged positions of the pointed end 3a of finger 3 is $$\frac{L}{2}$$

It will thus be understood that on displacement of the finger 3a through the length $$\frac{L}{2}$$

the toothed racks 5 and 6 in case of non-rotation of the sun wheel 4 will be moved in the same direction as the finger 3, by the same amount $$\frac{L}{2}$$

while the scale 10 will be moved by the distance $$2 \cdot \frac{L}{2} = L$$

through the gear 9, 9a, 9b, 9c.

On the other hand, as the finger 3 is moved through the length $$\frac{L}{2}$$

and the toothed rack 6 is held in its position, the sun wheel 4 will be rotated and thus cause movement of the toothed rack 5 and the scale 10 in the same direction of the finger 3, but by a distance $$L = 2 \cdot \frac{L}{2}$$

Again, if the finger 3 is retained in its position and the toothed rack 6 is moved through the distance L, the sun wheel 4 will be rotated and cause movement of the toothed rack 5 through the amount L, but in a direction opposite to that of the rack 6 while the scale 10 remains stationary.

It is important that the graduations or pitches of the scales 2a, 8 and 10 are properly harmonized with each other. All of the three scales are graduated equidistantly, i.e., the scales 8 and 10 are graduated with the same unit L which in case of the scale 8 corresponds to a change of the exposure time by the factor "2," and in case of the scale 10 corresponds to a change of the diaphragm value by the factor $\sqrt{2}$. The pitch of the scale $2a$ as mentioned above is $$\frac{L}{2}$$

and thus corresponds to a change of the light value and hence of the required exposure by the factor 2.

This system shown in Fig. 1 operates as follows, neglecting the necessary adjustment to be made to allow for the film sensitivity, any preset filter means etc., which adjustment will be described later.

The pointer 1a indicates on the scale 2a the light intensity value corresponding to the actual brightness to which the optical system of the photoelectric or light sensitive cell is exposed. The finger 3 is adjusted to the respective position of the pointer 1a, so as to engage in one of the jags of the serrated edge of the scale plate 2b. By this adjustment of the finger 3 and the movement of the sun wheel 4 caused thereby the easily shiftable toothed racks 5 and 6 and the operating means of shutter and diaphragm coupled therewith are moved into one of the positions corresponding to the reading on scale 2a. Simultaneously the scale 10 is displaced through the gear 9a, 9b, 9c, in such a way that finally those shutter and stop values are facing each other on the scales 8 and 10 which will result in the correct exposure in case of the measured light intensity value, the pair of values actually adjusted on the shutter by the toothed racks 5 and 6 being indicated by the pointer 7. In the example shown the exposure time 1/50 second and the stop value 2.8 has been adjusted. In order to adjust another pair of values, for example 1/10 second and stop 5.6, the photographer merely has to adjust the pointer 7 to the respective field of the scales 8 and 10. Since the finger 3 is locked in one of the jags, only the toothed racks 5 and 6 will be moved hereby and cause the corresponding adjustments on the shutter and diaphragm, while the sun wheel 4 and the scale 10 remain stationary. Thus, having once adjusted the finger 3 to the actual light intensity value, the user merely has to operate the pointer 7 in order to select the desired pair of exposure values out of those which are feasible under the prevailing light or exposure conditions.

Having thus described the principle of operation of the semi-automatic exposure control system illustrated in Fig. 1, we will now refer to Figs. 2 to 7 showing a camera embodying a mechanism which is particularly adapted for realizing this principle.

The camera consists of a casing 25 having a finder 26 and a film feeding and shutter tensioning lever 27. The optical system 28 includes a lever 22 for adjusting the shutter speed or exposure time and a lever 23 for adjusting the stop or diaphragm opening. The light admission aperture 29 is closed by a transparent glass plate 30 consisting of a plurality of honey comb-shaped lenses defining a light admission angle which corresponds to the exposure angle of the optical system of the camera. The light-sensitive cell (not shown) is connected to the moving coil 1 of the galvanometer whose permanent magnet is indicated at 31. The pointer 1a of coil 1 in this case cooperates with a cylindrical scale 102 provided with a helical curve 102a corresponding to the exposure characteristic of the photographic material and being exposed through a slot-shaped inspection window 15 provided with a linear mark or measuring thread 16. The cylindrical scale 102 is fixedly secured on a shaft 17 rotatably mounted on both ends in bearings 32. As best shown in Fig. 5, a toothed wheel 18 is fixedly mounted on a sleeve 33 rotatably seated on shaft 17 and formed at its end with a disc-shaped flange 34 which is recessed for reception of a scale disc 35 which is fixedly secured to shaft 17 by a screw 36. A spring 37 inserted between the discs 34 and 35 urges a ball 37a into one of a series of holes or recesses 37b in the flange 34, Fig. 5, the spacing between adjacent holes 37b corresponding to the angle between adjacent scale lines 41 on the scale disc 35 which scale lines mean sensitivity values of the photographic material and can be adjusted in steps with reference to a mark 40 on the rim of disc 34 by rotating the knob or flange 34 with respect to the disc 35, but will be secured against such relative rotation in normal operation by engagement of the ball 37a in one of the recesses 37b.

The toothed wheel 18 meshes with a toothed rack 19 which is riveted to a flexible strip 19a guided along the rear wall of the camera casing 25, on the left hand upper side of the camera. Connected to the opposite end of the flexible strip 19a is the adjusting device 103, 103a corresponding to the finger 3 in Fig. 3 and being operable by a handle 103 rotatably mounted on a shaft 124 on the opposite end of which is mounted a sun wheel 104. The shaft 124 is mounted for rotation in a transverse bore of a sleeve 42 which in its turn is mounted for rotation about the center axis of the shaft 44 of the gear system and of the semicircular curvature of the casing 25, so as to permit the flexible strip 19a to be guided on said curvature, as best shown in Figs. 3 and 6, in opposite grooves 43 of the outer wall of the upper part of casing 25, said outer wall 25 being slotted at 20, so as to permit the shaft 124 to extend therethrough and to be swung about the center of sleeve 42. Special means are provided to ensure that dislocation of the adjusted angular direction of shaft 124 is prevented in case of rotary adjustment of shaft 124 and vice versa. To this end, the knob 103 may be threadably engaged with the member 103a, as indicated in Fig. 7, and formed with a conical bore 39 cooperating with a slotted conically thickened end 38 of shaft 124. The operation of this locking device will be hereinafter described.

The sun wheel 104 meshes with bevelled planetary wheels 105 and 106 corresponding to the toothed racks 5 and 6 in Fig. 1, and its shaft 124 is mounted for rotation within the operating members 103, 103a, under control of a knurled knob 21 which is fixedly connected to shaft 124. The gear system shown in Fig. 1 at 9, 9a, 9b, and 9c in the practical embodiment of Figs. 2 to 7 is replaced by intermeshing toothed wheels 109, 109a, 109b and 109c. The toothed wheel 109 is fixedly secured on the sleeve or hub 42 which in turn is mounted on the central shaft 44 extending through the whole gear system. The toothed wheel 109 meshes with the toothed wheel 109a which is fixedly mounted on a shaft 45, Fig. 4, extending through a bearing 46 in a bearing plate 47 and a slot 48 in the planetary wheel 106. The toothed wheel 109b is mounted on the upper end of shaft 45, being secured against rotation by a key and groove connection, Fig. 4, and meshes with the toothed wheel 109c which is rotatably mounted on the central shaft 44 and formed with two upper projections or pins 49 engaging in bores 50 in a scale plate 110. The planetary wheel 106 is rotatably mounted on shaft 44 and bears on the one hand a projecting mark or pointer 107 and on the other hand a projecting pin 51 engaged in a slot 52 of a rigid operating strip 106a which is operatively connected to the lever 22 for adjusting the exposure time, as diagrammatically indicated in Fig. 2, by the upwardly bent extension 106b of the strip 106a and a stud 53 of lever 22 engaging in a slot 106c of said extension 106b. The strip 106a is cranked at 106d as indicated in Fig. 2. The bevel wheel 105 also bears a projecting pin or stud 54, engaging in a slot of the strip 105a which through an upright extension 105b and a stud 56 of the lug or lever 23 engaging a slot 105c in said extension 105b, operates the stop adjusting lever 23 of the camera. The camera shown in Figs. 2 to 7 is operated as follows, as far as the adjustment of the stop and shutter speed values is concerned:

First, the film sensitivity or speed of the photographic material is adjusted on the device shown in Fig. 5, by rotating the knob 34 in relation to the scale 41 on disc 35 until the respective line of scale 41 faces the mark 40.

Also, any preset filters or the like can be taken care of by this adjustment which acts to rotatively displace the scale roller 102 in relation to the toothed wheel 18. Now, with the roller 102 and the toothed wheel 18 being secured against mutual rotation, in case of normal torques, by engagement of the ball 37a in one of the holes 37b, the camera is directed towards the objective to be photographed. The light current admitted through the admission aperture 29 and the glass plate 30 impinges upon the photoelectric or light-sensitive cell (not shown) and produces an electric current whose intensity is indicated by the moving coil 1 and the pointer 1a. The deflection of the pointer is observed through the inspection slit 15, Fig. 2, and the scale roller 102 is now rotated, through the flexible strip 19a, the toothed rack 19 and the toothed wheel 18, by swinging the members 21, 103, 103a, 103b about the axis of shaft 44, until the pointer 1a, the thread or linear mark 16, and the curved line 102a on the scale roller 102 intersect with each other in a common point. In order to permit such swinging motion, the knob 103 must be loosened with respect to the wall of casing 25 by screwing it in an anticlockwise direction, whereby at the same time the shaft 124 is locked against rotation by mutual engagement of the conical faces 38 and 39. It will be understood that by such adjustment the bevel wheels 105 and 106 have been rotated through the same angle and simultaneously have transmitted such angular rotation, through the adjusting member 105a, its extension 105b, and the stud 56, to the stop adjusting lever 23, and on the other hand, through the pin 51 of the planetary wheel 106, the strip 106a, its extension 106b, and the stud 53 to the lever or lug 22 for adjusting the shutter speed or exposure time. Thus, the correct exposure values are adjusted on the objective lens, provided that the path traversed by the adjusting knob 103, 103a about the axis of shaft 44 is long enough to cover all values which can be indicated by the measuring system 1, 1a and that the movement of the adjusting strips 105a and 106a properly corresponds to the characteristic of the adjusting means for the stop and shutter values.

The exposure values thus adjusted are indicated on scale 110, showing the stop values, and on scale 108, showing the shutter speed values, respectively, by the pointer 107 which is movable in the annular slot 55 between said two scales 108 and 110, Figs. 2, 3 and 4.

If it is intended to use another pair of stop and shutter values than that actually indicated by the pointer 107, the photographer merely has to tighten the knob 103 with respect to the wall of casing 25 and turn the now released knurled knob 21, whereby the planetary wheels 105 and 106 are rotated in opposite directions, through shaft 124 and sun wheel 104, and the adjusting members connected thereto are readjusted in the manner as hereinbefore described. The actual adjustment thus obtained is indicated by the pointer 107 rotating with planetary wheel 106. During this adjustment, the members 103, 103a, 103b, 124 and 19a are retained in their adjusted position as regards the direction of shaft 124 owing to the above mentioned locking of the knob 103 on the wall of the casing 25.

While the invention has been described in detail with respect to certain now preferred examples and embodiments of the invention it will be understood by those skilled in the art after understanding the invention that various changes and modifications may be made without departing from the spirit and scope of the invention and it is intended therefore, to cover all such changes and modifications in the appended claims.

The term "photographic camera," wherever used in this specification and in the claims, includes cinematographic cameras as well.

We claim:

1. In a photographic camera, a casing in the form of a rectangular body with semicircularly rounded ends, an optical system projecting from the forward wall of the camera casing, a shutter and a diaphragm incorporated in said optical system, means for adjustment of said shutter and means for adjustment of said diaphragm by rotary swinging movements about the center axis of the optical system, respectively, a photoelectric exposure meter mounted in the top part of the casing and including a pointer, a reference line, and a scale roller whose axis is parallel to said reference line and which bears on its superficies substantially helically arranged marking means adapted to be selectively moved into coincidence with the intersection of the pointer and the reference line, by rotational displacement of the roller, a planetary gearing mounted in the top part of the casing so as to be coaxial, as to its stationary axis, with the semicircular rounding at one end of the casing, said planetary gearing comprising a sun wheel, a sun wheel shaft, means including a handle protruding from the semicircular rounding of the casing for swinging the sun wheel shaft about the stationary axis and for rotating the sun wheel shaft, said sun wheel shaft swinging means also comprising a toothed wheel coaxially mounted in relation to the scale roller and adapted to be selectively connected thereto in various angular positions to allow for different film speed values, scale means graduated in film sensitivity values for indicating the actual position of the scale roller in relation to the toothed wheel, a flexible strip, a toothed rack operatively connected to the sun wheel shaft by said flexible strip for swinging the sun wheel shaft into different angular positions corresponding to the scale roller and film speed adjustments, a pair of planet pinions one of which is operatively connected to the shutter speed adjusting means while the other is operatively connected to the diaphragm opening adjusting means, two concentrically arranged exposure scales mounted in the top face of said casing, coaxially with the planet pinions, one of said exposure scales showing shutter speed and the other showing diaphragm values, either of said exposure scales being operatively connected to said sun wheel shaft swinging means, while the other exposure scale is stationary, the sun wheel acting to adjust by its rotation the desired pair of shutter speed and diaphragm values, among those pairs which are mechanically possible at a given angular position of the axis of the sun wheel shaft, and indicator means mounted on the upper planet pinion, for indicating on said scales the selected pair of shutter speed and diaphragm values.

2. A photographic camera comprising a camera casing, an optical system non-extensibly connected to the casing and comprising lens means, a shutter, a diaphragm, shutter speed adjusting means, and lens diaphragm adjusting means, in combination with semi-automatic exposure control mechanism comprising a second casing in the form of a top attachment adapted to be secured on the top of the camera casing as a closure cap, shutter speed adjusting means, diaphragm opening adjusting means, first scale means for indicating shutter speed values, second scale means for indicating diaphragm opening values, said first and second scale means being adjacently arranged, first indicator means connected with said shutter speed adjusting means for indicating the actually adjusted shutter speed, second indicator means connected with said lens diaphragm adjusting means for indicating the actually adjusted diaphragm opening values, an exposure meter having a pointer, a follower arranged below said pointer and bearing marking means for adjustment of the follower in accordance with the deflection of the pointer, for indicating the pairs of shutter speed and diaphragm opening values which would correspond to said deflection, and planetary gear means including a pair of planet wheels, a sun wheel, a common operating handle including means for swinging the shaft of the sun wheel of the planetary gear in such a way that the follower coincides with the actual position of the deflected pointer, either of said exposure scales being operatively connected to the follower to reflect the position thereof, said common handle also including rotatable means for rotating said sun wheel for selectively adjusting the desired pair of shutter speed and diaphragm values, said indicator means adapted to be moved in dependence upon the rotational displacement of the sun wheel, for indicating the selected pair of shutter speed and diaphragm values.

3. A photographic camera as per claim 2, in which the exposure control mechanism includes locking means operative to selectively lock either the sun wheel shaft swinging means or the sun wheel shaft rotating means.

References Cited in the file of this patent

UNITED STATES PATENTS

| | | |
|---|---|---|
| 2,199,464 | Kuppenbender et al. | May 7, 1940 |
| 2,209,156 | Fischer | July 23, 1940 |
| 2,242,013 | Martin | May 13, 1941 |
| 2,285,761 | Tonnies | June 9, 1942 |
| 2,305,294 | Kuppenbender | Dec. 15, 1942 |
| 2,340,622 | Simmon | Feb. 1, 1944 |
| 2,341,393 | Simmon | Feb. 8, 1944 |
| 2,351,978 | Kuppenbender | June 20, 1944 |
| 2,360,256 | Mihalyi | Oct. 10, 1944 |
| 2,418,370 | Simmon | Apr. 1, 1947 |
| 2,467,946 | Rossmann et al. | Apr. 19, 1949 |
| 2,576,813 | Simons | Nov. 27, 1951 |
| 2,699,087 | Gossen et al. | Jan. 11, 1955 |

OTHER REFERENCES

"Belichtungsmesser richtig angewendet" (Busch) Phototechnik and Wirtschaft, vol. 3, No. 3, March, 1951, pages 99–101.